Feb. 5, 1935.  A. G. THOMAS  1,989,952
FLOWER HOLDER
Filed June 13, 1932  4 Sheets-Sheet 1
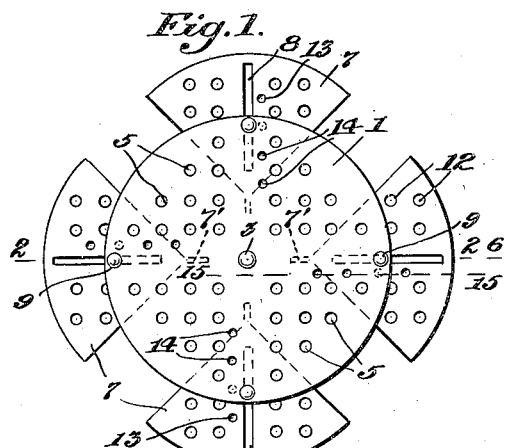
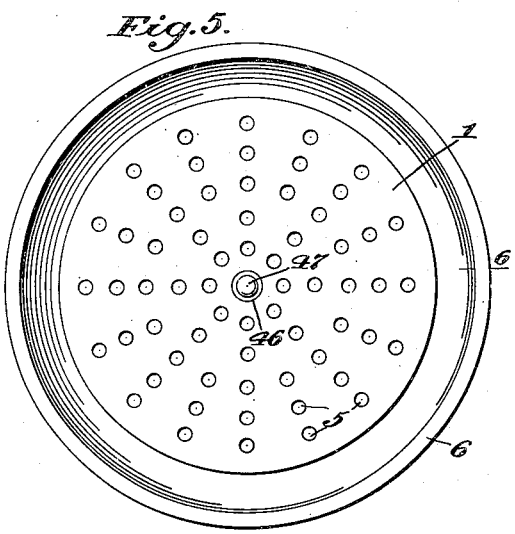
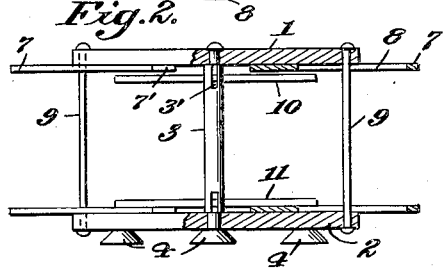
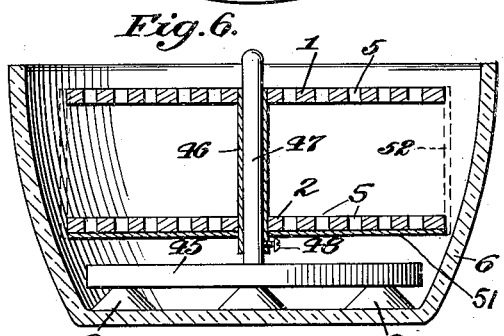
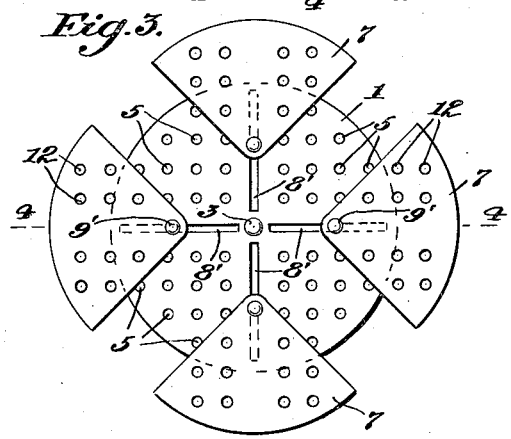
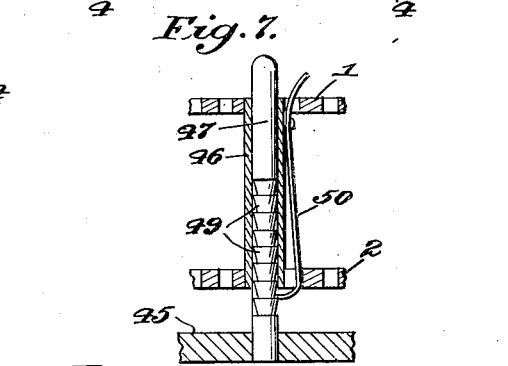
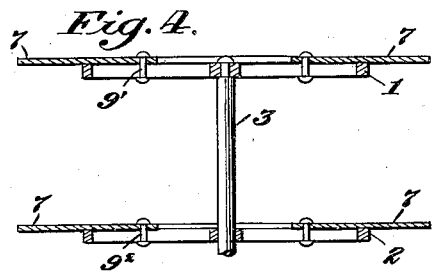
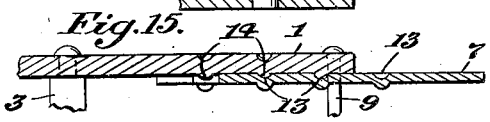
Inventor:
A. G. Thomas,
Att'y Feb. 5, 1935.  A. G. THOMAS  1,989,952
FLOWER HOLDER
Filed June 13, 1932  4 Sheets-Sheet 2

Inventor:
A. G. Thomas,
by A. P. Greely
Att'y.

Feb. 5, 1935. A. G. THOMAS 1,989,952
FLOWER HOLDER
Filed June 13, 1932 4 Sheets-Sheet 3
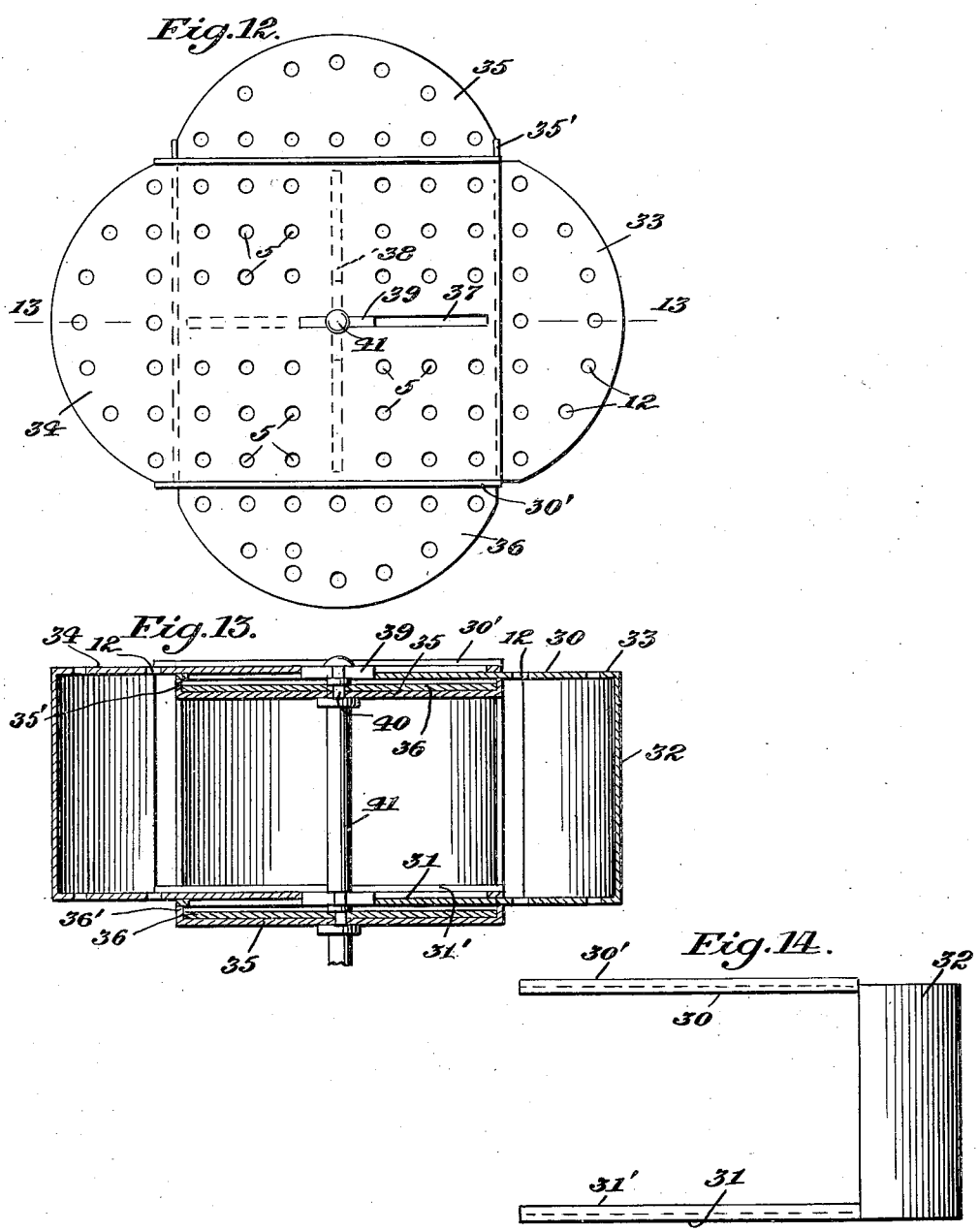
Inventor:
A. G. Thomas,
by A. P. Greeley
Att'y.

Feb. 5, 1935.  A. G. THOMAS  1,989,952
FLOWER HOLDER
Filed June 13, 1932  4 Sheets-Sheet 4
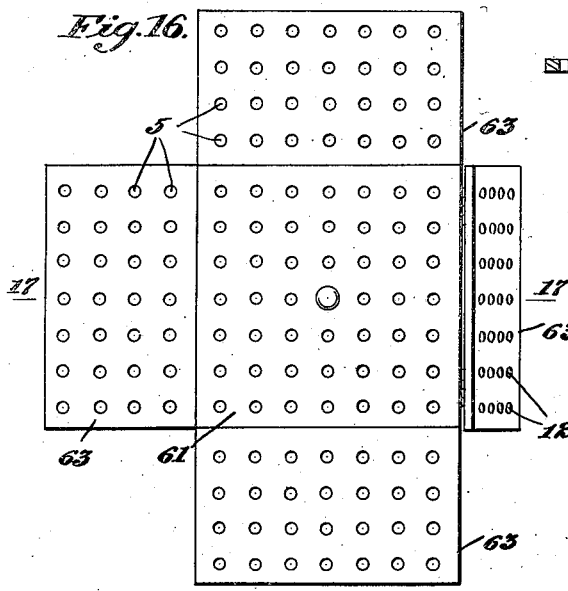
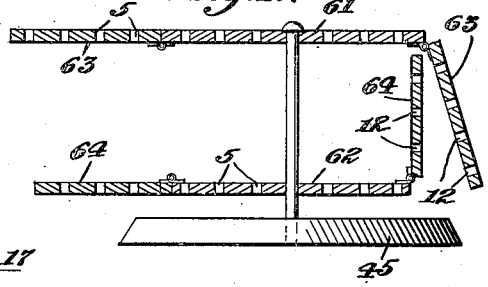
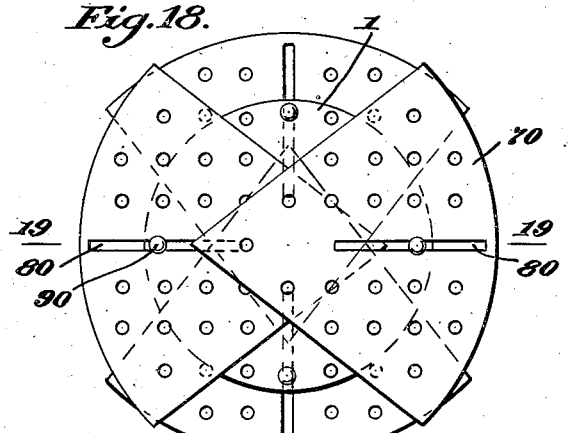
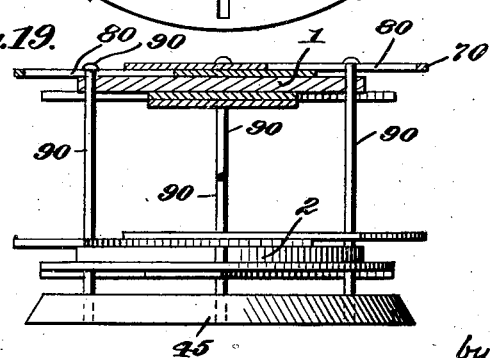
Inventor:
A. G. Thomas,
by A. P. Greeley
Att'y.

Patented Feb. 5, 1935

1,989,952

UNITED STATES PATENT OFFICE 1,989,952

FLOWER HOLDER

Albert G. Thomas, Lynchburg, Va.

Application June 13, 1932, Serial No. 617,021

8 Claims. (Cl. 47—41)

My invention relates to flower holders of the type which is adapted to be received in a bowl or other container and is provided with openings, vertical or inclined, to receive the stems of flowers and to support them in desired positions. Such flower holders are in common use and are ordinarily rigid structures adapted to fit only a bowl of particular diameter.

It is the object of my invention to provide a flower holder of this general type which will be capable of expansion to fit bowls of differing diameters by so constructing the flower holder that portions of it provided with openings to receive flower stems may be moved outward from a centre so as to enlarge the surface area of the device as a whole. A further object of my invention is to provide a central member itself provided with openings for flower stems with extension elements provided with openings for flower stems and so secured to it as to be capable of being slid or swung outward to extend portions thereof beyond the periphery of the centre member. A further object of my invention is to so space and arrange the openings for flower stems of the centre member and of the extension elements that whether in extended or retracted position the stem openings of the one will be in register with the stem openings of the other so that the flower stems may be inserted. A further object of my invention is to provide for vertical adjustment of the flowers to suit bowls of differing depths. And while my invention is particularly intended and adapted for holding flowers it is obviously capable of use for holding any articles having portions thereof adapted to enter stem openings such as hereinafter described, which it is desired to display.

With the objects above indicated and other objects hereinafter explained, in view, my invention consists in the construction and combination of elements hereinafter described and claimed.

Referring to the drawings:

Figure 1 is a top plan view of one type of flower holder embodying my invention.

Figure 2 is in part a side view, and in part a central, vertical, sectional view of the flower holder on line 2—2 of Figure 1.

Figure 3 is a top plan view of a modified form of flower holder.

Figure 4 is a central, vertical, sectional view on line 4—4 of Figure 3.

Figure 5 is a top plan view of a flower holder arranged in a bowl and constructed to permit of vertical adjustment of the flower stems.

Figure 6 is a central vertical sectional view on line 6—6 of Figure 5.

Figure 7 is a fragmentary sectional view on the same line as Figure 6 but showing a modified means for holding the flower holder in elevated position.

Figure 12 is a top plan view of a further modification of my flower holder.

Figure 13 is a central vertical sectional view on line 13—13 of Figure 12.

Figure 14 is a detail view of one of the expansion elements of the construction shown in Figures 12 and 13.

Figure 15 (sheet 1) is a fragmentary cross sectional view on line 15—15 of Figure 1.

Figure 16 is a top plan view of a modified construction in which expansion elements are hinged to a centre member.

Figure 17 is a cross sectional view on line 17—17 of Figure 16.

Figure 18 is a top plan view of the further modified form in which expansion elements are arranged to be capable of an increased expansion movement, and Figure 19 is in part a cross sectional view on line 19—19 of Figure 18, and in part a side view.

Figure 8:
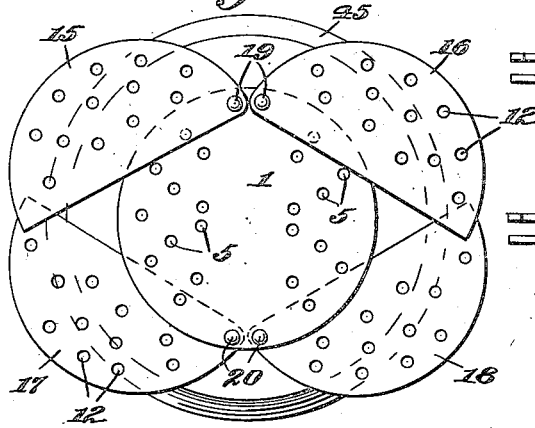
Figure 8 is a top plan view of a further modification of my flower holder.

In the drawings, 1 and 2 indicate central discs which may be secured at their centres to a vertical post 3 by which they are held apart a distance suitable for supporting a flower stem. Disc 2 may be provided on its under face with feet 4, preferably suction discs, for holding the lower disc 2 slightly raised from the bottom of a bowl or other supporting means.

Discs 1 and 2 in my flower holder are provided with numerous openings 5 to receive flower stems as in flower holders of well known construction, and on these central discs are carried extension elements adapted to afford an increased area over that of the central disc for holding flower stems and adapted to be so adjusted with reference to the central discs as to vary the increased area.

In Figures 1 to 4 inclusive the extension members are carried by the centre disc above or below disc 1 and above disc 2 and are arranged to be slid in and out on radial lines, while in Figures 8 to 11 the extension members are pivotally secured to the central discs so as to swing on these pivots.

Referring particularly to Figures 1 and 2, the extension elements 7 are segmental in form and may be semicircles or any division thereof and are each provided with a slot 8 to receive a rod or pin 9 which, as shown, may extend as a rod from disc 1 to disc 2 and serve to form with these discs a rigid structure. Spacing plates 10 and 11 are preferably provided below disc 1 and above disc 2 to hold the extension elements against the respective discs. The extension elements 7 are so shaped that when moved inward to the limit permitted by the slots 8 their outer edges will be in register with the periphery of the central discs. These extension members are provided with openings 12 adapted to receive flower stems and these openings are so arranged that they will register with openings 5 of the central discs. To ensure registry of the openings 12 of the extension elements with openings 5 of the discs 1 and 2, see Figure 15, the extension elements are preferably provided with one or more rounded recesses 13 on the face of the adjacent central disc by which it is carried adapted to engage teats 14 on the adjacent face of the disc, the recess 13 and the teat 14 forming a stop for the extension element from which it may be readily displaced by inward pressure or outward pull.

For the purpose of guiding the extension elements 7 to proper position when retracted the extension elements may each be provided at its inner end with an inwardly extending tongue $7^1$ to extend into slot $3^1$ in the centre post 3.

In the construction shown in Figures 6 and 7 the discs 1 and 2 are without the extension elements and are carried on a tube 46 which is adjustable on a centre post 47 which is carried by a base disc 45 which may be provided with suction cup feet 4. Tube 46 carrying the discs 1 and 2 is adjustable on post 47 by any convenient means as by set screw 48 as shown in Figure 6 or by spring dog 50 engaging notches 49 on centre post 47. The centre post may be of any desired vertical length and while the device is particularly intended to be used in a bowl 6 as shown, it may be used outside of a bowl. Discs 1 and 2 are provided with perforations 5 for flower stems and disc 2 is preferably provided on its under side with a plate 51 of thin metal or other material to prevent flower stems from extending through perforations 5 of lower plate. If desired the peripheries of discs 1 and 2 may be connected by a band 52 to form a cup capable of containing water.

In the construction shown in Figures 3 and 4 the elements carried by the upper central disc are arranged on its upper face instead of below it as in Figures 1 and 2 and instead of rods 9 extending from disc 1 to disc 2, separate pins $9^1$ are used with the discs 1 and 2, these pins being carried by the extension elements and extending through radial slots $8^1$ in the central discs.

Figure 10:
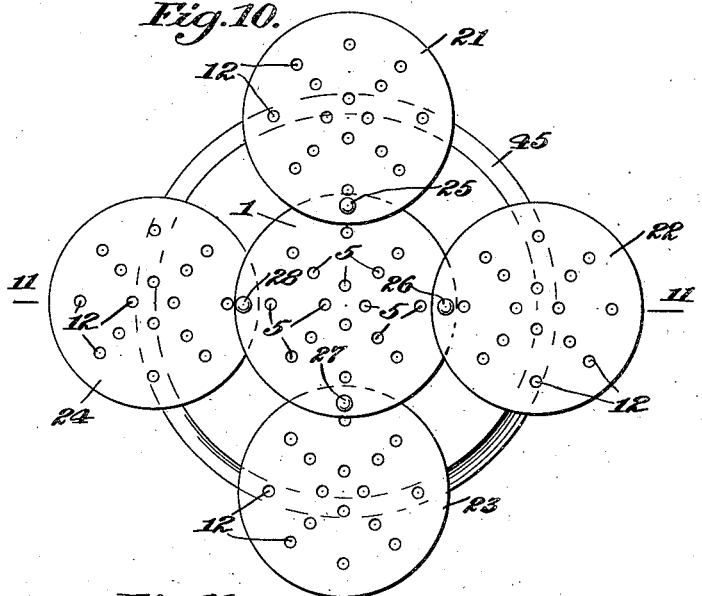
Figure 10 is a top plan view of a further modification of my flower holder.
Figure 11:
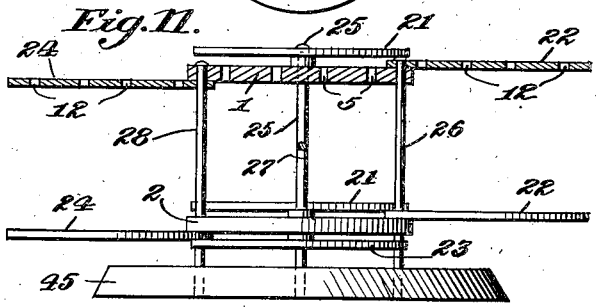
Figure 11 is in part a central vertical cross-sectional view on line 11—11 of Figure 10, and in part a side view.

While pivots 25, 26, 27, and 28, see Figures 10 and 11, may be mere pins they are preferably rods extending upward from base 45. The extension elements must, of course, be of less diameter than the centre member 1 so that when swung into closed position they will be wholly within the peripheral line of the centre member.

In the construction shown in Figures 8, 9, 10 and 11, the extension elements are pivotally secured to the central discs and are swung on their pivots to enlarge or vary the area of the flower holder. In the construction shown in Figures 8 and 9 the extension elements are semicircular and are pivoted to disc 1 (or disc 2) in pairs, one pair 15—16 above and the other pair 17—18 below the central disc, the pivot rods 19—19 of one pair being at a point near the periphery of the central disc diametrically opposite the pivot rods 20—20 of the other pair. The pivot rods 19—19 and 20—20 extend through the extension elements of the respective pairs at points near the adjacent ends of their diametrical lines so that when swung inward the outer lines of the pair will register with the periphery of the disc on which they are carried, the pivot rods being carried by base 45.

In the construction shown in Figures 10 and 11, the extension elements are shown in the form of discs each separately pivoted at a point near its periphery to the central disc 1 (or 2) at a point near its periphery but may be of any form other than a disc if desired. In this construction two of the extension elements 21 and 22 are above the upper face of disc 1 and are pivoted, by pivots 25 and 26 respectively, at points 90 degrees apart if four extension elements are used. If a greater or less number than four are used the distances apart of the pivots will be varied. The other pair of extension elements, 23 and 24, are arranged below the central disc and are pivotally secured to the disc by pivots 27 and 28, pivot 27 being at a point near the periphery of the central disc 90 degrees from pivot 26 and pivot 28 being 90 degrees from pivot 27 and also 90 degrees from pivot 25. This arrangement of two extension elements above and two below the disc on which they are carried and the arrangement of the pivots 90 degrees apart is to permit all of the extension elements when swung inward on their pivots to be within the peripheral lines of the central discs.

In Figures 12 and 13 I have shown a modified construction in which the extension elements each consists of a strip of metal or other sheet material bent into U shape with the legs extending horizontally inward and the portion joining the ends of the legs forming a vertical spacing member, the U shaped members being arranged in pairs, the members of each pair being slidable one on the other to enlarge or reduce the area of the flower holder, the two pairs being arranged at right angles and suitably connected to hold them together and at the same time to permit outward and inward movement of the members of each pair. In this construction 30 and 31 indicate the horizontal legs of an expansion element of the construction shown in Figures 12 and 13, and 32 indicates the spacing member joining the outer ends of these legs. The legs of the expansion elements 33 and 34 extending to the right and left in Figure 12 are arranged above the legs of the expansion elements 35 and 36 which extend upward and downward respectively in Figure 12, correspond to disc 1 of Figures 2, 4, 9 and 11, and are arranged also above the legs of expansion elements 35 and 36 at the lower end of the flower holder and the combination corresponds with disc 2 in the figures referred to.

In order to hold the two pairs of extensible elements together the legs of each pair are slotted longitudinally as shown at 37 and 38 and in these slots are arranged guides 39 and 40 carried by a central vertical rod 41.

The side edges of one member of each pair may be bent upward and inward as shown at 30[1], 31[1], 35[1], and 36[1], so as to enclose the horizontal members of the opposite member of the pair. The horizontal elements 30, 31, 35, 36, may be flared to overlap if desired.

The horizontal portions of the extensible members are provided with openings 12 to receive flower stems.

Figures 16 and 17 show a modified form in which the centre members 61 and 62, correspond to centre members 1 and 2 of Figures 1 to 11. To each of the four edges of the upper centre member 61 is hinged an extension element 63, these extension elements being so hinged as to swing downward into closed position. To each of the four edges of the lower centre members 62 is hinged extension element 64, these extension elements being so hinged as to swing upward into closed position. The centre members 61 and 62 are provided with openings 5 for flower stems and the extension elements 63 and 64 are provided with openings 12 for flower stems.

In Figures 18 and 19 is shown a modified form of the radially sliding expansion element construction shown in Figures 1 to 4 inclusive intended to permit increase of the area of the flower holder without having the gaps between adjacent expansion elements which are shown in Figures 1 and 3. In order to secure this result the segmental expansion elements 70 are formed as segments of a disc of a diameter greater than the diameter of the centre disc 1 and 2. The segmental expansion elements are shown as quadrants so that when in fully expanded position they will together form a complete circular disc but may be more or less than quadrants if desired. These segments are each provided with a radial slot 80 in which is received rod 90 which is carried by and extends upward from base 45. The slot 80 is necessarily considerably longer than slot 8 of Figures 1 and 2 to permit the segments to have the desired extent of movement. The segments of each pair when in retracted position will overlap one upon the other and when in such retracted position their peripheral lines will be outside the peripheral line of the centre member.

The openings for flower stems in all of the constructions shown are to be arranged at corresponding distances apart on the extension elements and on the central members so that when one of the openings in one movable element is brought in register with an opening of the member on which it moves all its other openings will be in register with the openings in the other members. This registry will be facilitated by the construction shown in Figure 15 and this construction may, of course, be used with any of the modifications.

Figure 9:
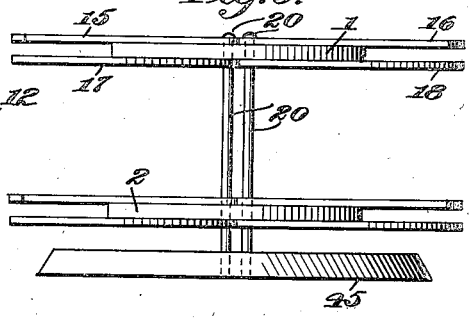
Figure 9 is a side view of the flower holder shown in Figure 8.

The flower holder as shown in Figures 1 to 4 is without a base other than the lower one of the central discs while in Figures 9 and 10, as well as in Figures 6 and 7, the two central discs are supported on a base 45. It should be understood that this base 45 may be used with any of the specific forms and, of course, any of the specific forms with or without base 45 may be used in a bowl if desired.

The plate 51 which closes the lower ends of the openings in lower disc 2 as shown in Figure 6 prevents the ends of the flower stems from slipping through and will hold the flowers in position while the discs are raised or lowered on post 47 or while the flower holder is lifted out of a bowl to be transferred to another bowl, or to hold the flowers out of a bowl. And if the peripheries of the discs 1 and 2 as shown in Figure 6 are connected by band 52 a cup will be formed for holding water and flowers may be held with their stems in this cup without placing the device in a bowl.

In the use of the flower holder above described assuming the extension elements to be slid or swung together so as to occupy the least horizontal area, in which condition they should be for transportation or storage; if, with the extension elements thus closed in, the flower holder will not hold all the flowers desired or will not hold them spread out as desired, the extension elements 7 in the construction shown in Figures 1 to 4, or extension elements 70 in Figures 18 and 19, are pulled outward to the extent desired, or the extension elements 15 to 18 shown in Figures 8 and 9, or elements 21 to 24 shown in Figure 11, are swung outward on their pivots so as to enlarge the horizontal area. The stems of the flowers may then be inserted in the openings in the extension elements. After flower stems are placed in the openings of the extension elements their position may be shifted somewhat by moving the extension elements in and out.

The same result may be effected by sliding the U shaped members of the construction shown in Figures 12 and 13 in and out.

It is, of course, to be understood that the upper and lower extension elements may be connected to move together in or out, or they may be made separately adjustable.

Having thus described my invention what I claim is:—

1. A flower holder comprising members each having a plurality of openings therein to receive flower stems extensible horizontally from a vertical center movable one upon another to vary the area of the surface so as to fit receptacles of different sizes and to accommodate a greater or lesser number of flower stems.

2. A flower holder comprising members each having a plurality of openings therein to receive flower stems extensible horizontally from a vertical center movable one upon another to vary the area of the surface so as to accommodate a greater or lesser number of flower stems, the flower stem openings in an overlying member being spaced and arranged to correspond with the spacing and arrangement of the stem openings of the underlying member.

3. A flower holder comprising members having openings therein to receive flower stems movable one upon another to vary the area of the surface so as to accommodate a greater or lesser number of flower stems, the flower stem openings in an overlying member being spaced and arranged to correspond with the spacing and arrangement of the stem openings of the underlying member, and means carried by an overlying member engaging means carried by an underlying member for checking the movement of one upon the other when the stem openings of the one are in register with the stem openings of the other.

4. A flower holder comprising a centre member having a plurality of openings therein for flower stems and extension elements carried by and movable with reference to the centre member to positions outside its periphery, said extension elements being each provided with a plurality of openings for flower stems and being arranged to move one upon another.

5. A flower holder comprising a centre member having openings therein for flower stems and extension elements carried by and movable with reference to the centre member extending the area of the flower holder beyond the periphery of the centre member, said extension elements being provided with openings for flower stems spaced and arranged to correspond with the spacing and arrangement of the stem openings of the centre member.

6. A flower holder comprising a centre member having openings therein for flower stems and extension elements carried by and movable with reference to the centre member extending the area of the flower holder beyond the periphery of the centre member, said extension elements being provided with openings for flower stems spaced and arranged to correspond with the spacing and arrangement of the stem openings of the centre member, and means carried by an extension element engaging means on the centre member for checking relative movement when the stem openings of the one are in register with the stem openings of the other.

7. A flower holder comprising a centre member having openings therein for flower stems and extension elements carried by and movable radially with reference to the centre member to extend the area of the flower holder beyond the periphery of the centre member, said extension elements being provided with stem openings and means adapted to permit radial movement securing the extensions to the centre member.

8. A flower holder comprising a centre member having openings therein for flower stems and extension elements carried by and movable radially with reference to the centre member to extend the area of the flower holder beyond the periphery of the centre member, said extension elements being provided with stem openings and means adapted to permit radial movement securing the extensions to the centre member comprising a slot in one and a pin carried by the other engaging the slot.

ALBERT G. THOMAS.